Nov. 5, 1935.　　　　　E. JUSTESEN　　　　　2,019,569
BEARING
Filed Feb. 23, 1935　　　2 Sheets-Sheet 2
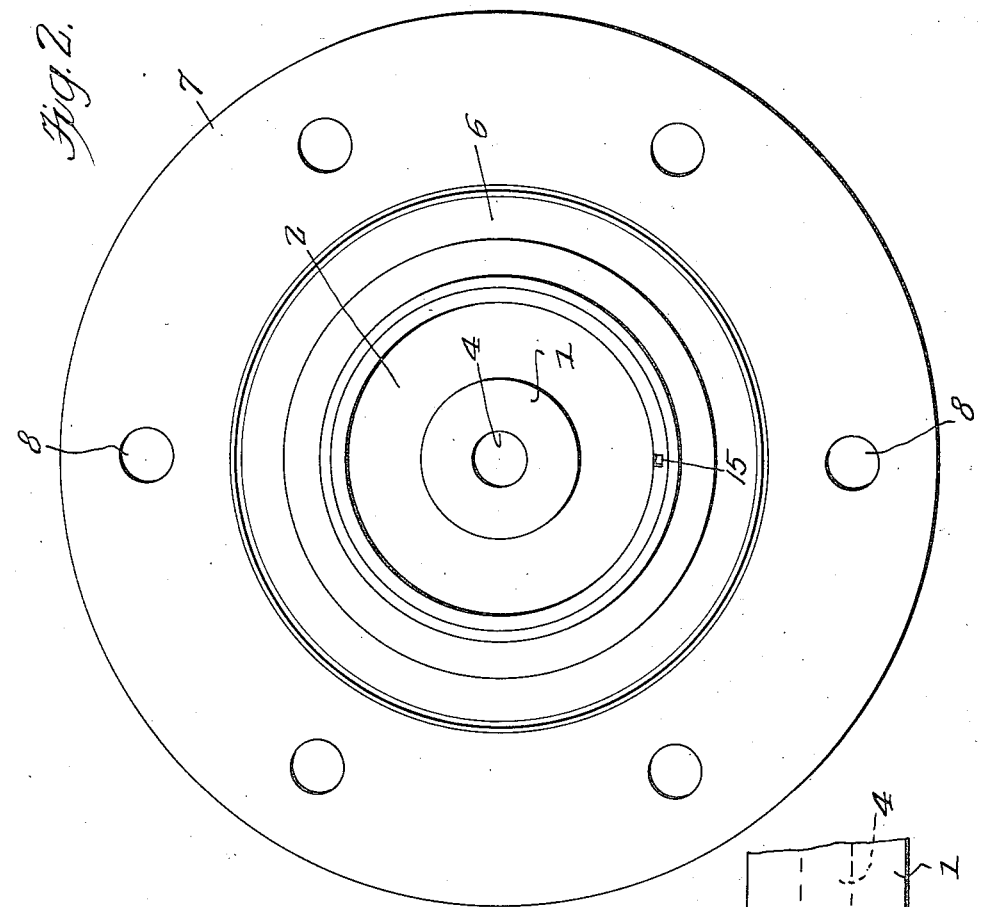
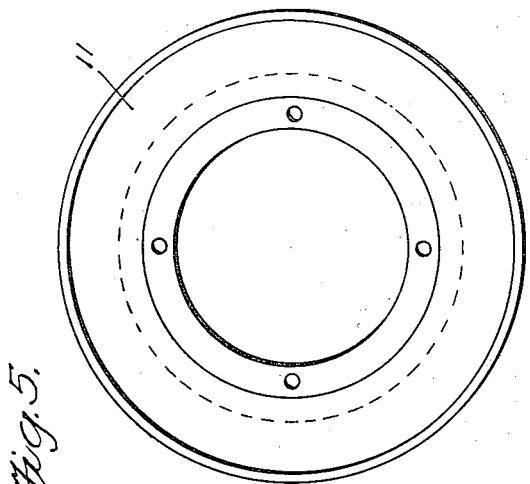
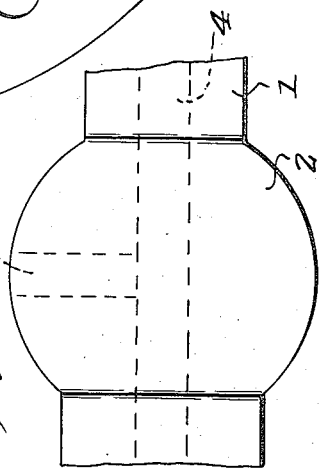
Inventor
*Edward Justesen,*
By *Clarence A. O'Brien*
Attorney Patented Nov. 5, 1935

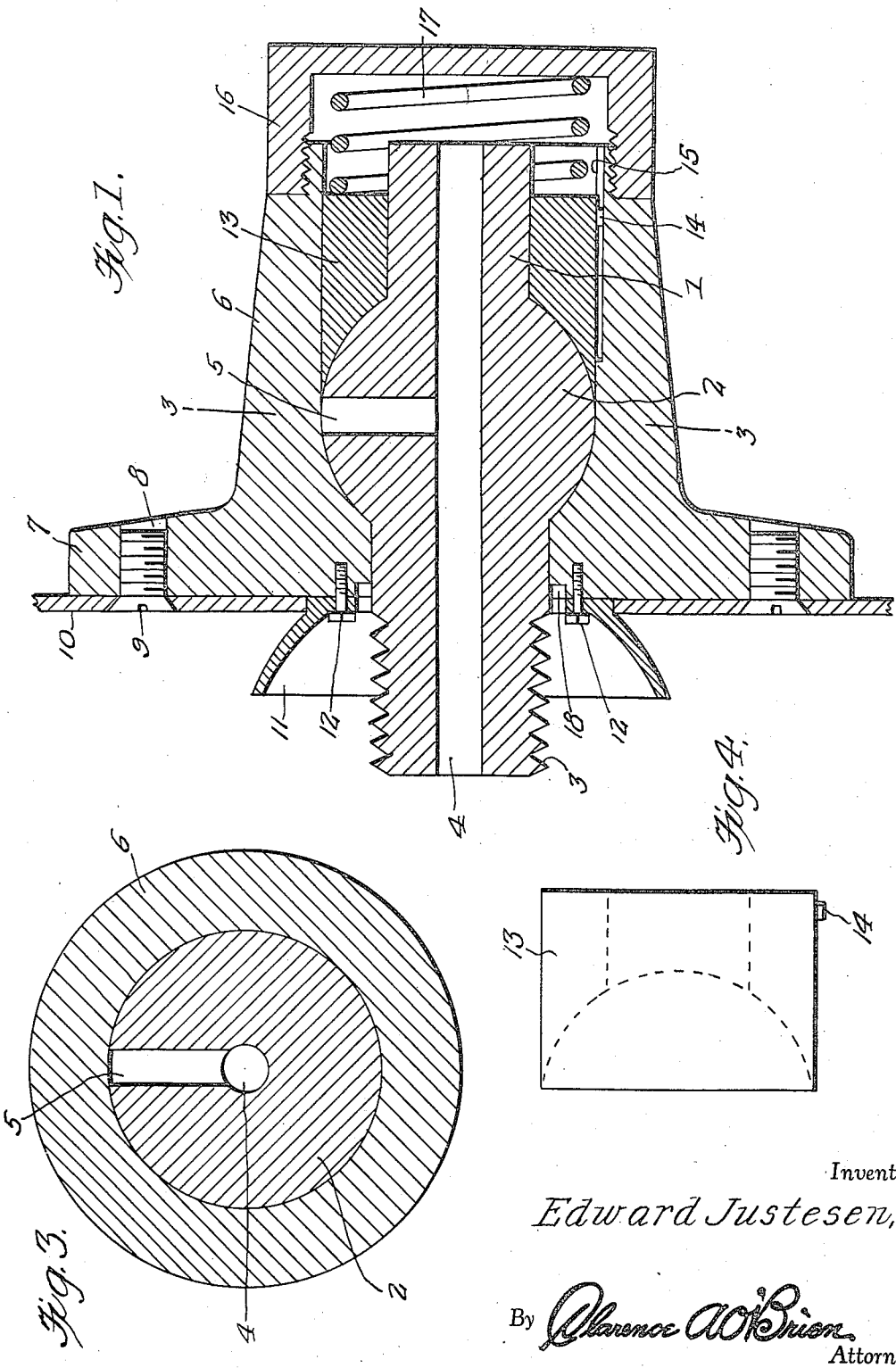

2,019,569

UNITED STATES PATENT OFFICE 2,019,569

BEARING

Edward Justesen, Beach, N. Dak.

Application February 23, 1935, Serial No. 7,895

3 Claims. (Cl. 308—19)

The present invention relates to new and useful improvements in bearings for use particularly on agricultural machines such as double and single disk drills, harrows, colters, etc., but it will be understood, of course, that a bearing in accordance with the present invention may be used for any purpose for which it may be found adapted.

An important object of the present invention is to provide, in a manner as hereinafter set forth, a bearing of the aforementioned character which embodies novel means for automatically compensating for wear.

Another very important object of the invention is to provide a bearing of the character described which comprises novel means for excluding dust, dirt and other foreign matter.

Still another important object of the invention is to provide a bearing of the character set forth which may be kept thoroughly lubricated at all times.

Other objects of the invention are to provide a bearing of the aforementioned character which will be comparatively simple in construction, strong, durable, reliable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in vertical longitudinal section through a bearing constructed in accordance with the present invention.

Figure 2 is a view in end elevation thereof.

Figure 3 is a view in vertical transverse section, taken substantially on the line 3—3 of Figure 1.

Figure 4 is a detail view in perspective of the slidable bushing.

Figure 5 is a detail view in elevation of the dust shield.

Figure 6 is a fragmentary view in side elevation, showing the ball portion of the spindle.

Referring now to the drawings in detail, it will be seen that the embodiment of the invention which has been illustrated comprises a spindle 1 having a substantially ball-shaped intermediate portion 2. The spindle 1 further includes a threaded end portion 3 for connection with the machine upon which the bearing is to be mounted. An oil duct 4 extends longitudinally through the spindle 1 and communicating with said duct 4 is a branch 5 which extends to the periphery of the ball 2.

Journaled on the spindle 1 is a hub 6 of suitable metal, the interior of which is formed for engagement with one side of the ball 2, as illustrated to advantage in Figure 1 of the drawings. On its inner end, the hub 6 has formed integrally therewith a flange 7 having threaded openings 8 therein for the reception of countersunk screws 9 which secure the disk 10 in position. Also secured on the inner end of the hub 6, within the opening in the disk 10 and encircling the spindle 1, is a dust shield 11. It will be noted that the shield 11 is substantially saucer-shaped. Screws 12 secure the shield 11 in position.

Slidably mounted in the outer portion of the hub 6 and keyed therein is a bushing 13 the inner end of which is shaped to conform to the outer side of the ball 2 with which said bushing is engaged. The reference numeral 14 designates a pin or key on the bushing 13 which is slidably engaged in a groove 15 which is provided therefor in the hub 6. A cap 16 is threadedly mounted on the outer end of the hub 6. The reference numeral 17 designates a coil spring having one end engaged with the cap 16 and its other end engaged with the bushing 13 for yieldingly urging said bushing against the ball 2 in a manner to automatically compensate for wear as it occurs.

It is thought that the manner of assembling the bearing will be readily apparent. The spindle 1 is inserted in the hub 6, the ball 2 of said spindle seating in the correspondingly shaped inner portion of said hub which is provided therefor. The bushing 13 is then mounted on the spindle 1 in the outer portion of the hub 6 and the coil spring 17 is then engaged with said bushing. The cap 16 is then applied, said cap maintaining the coil spring 17 under tension. It will thus be seen that as wear occurs in the bearing the bushing 13 is forced inwardly at all times by the spring 17 in a manner to take up said wear. Of course, the disk 10 must be applied to the flange 7 before the dust shield 11 is mounted in position. The inner end of the hub 6 has formed therein a seat or groove 18 in which a washer of fiber or other suitable material may be placed to further exclude foreign matter and prevent the escape of the lubricant.

It is believed that the many advantages of a bearing constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A bearing of the class described comprising a spindle including an integral intermediate ball portion, a hub journaled on said spindle and engaged with one side of the ball, a bushing slidably and rotatably mounted on the spindle and engaged with the other side of said ball, said bushing being slidably keyed to the hub for rotation therewith, and resilient means encircling one end of the spindle and yieldingly urging the bushing toward the ball.

2. A bearing comprising a spindle including an integral intermediate ball portion, a hub journaled on the spindle and engaged with one side of the ball, a bushing rotatably and slidably mounted on the spindle and engaged with the other side of said ball, means slidably connecting the bushing to the hub for rotation therewith, a removable cap threadedly mounted on the hub, and a coil spring mounted in the cap and having one end engaged therewith and its other end engaged with the bushing and encircling the end of the spindle for yieldingly urging said bushing against the ball.

3. A bearing comprising a spindle including an integral intermediate ball portion, said spindle having a lubricant duct extending longitudinally therethrough and further having a branch lubricant duct extending from the first-named duct to the periphery of the ball, a hub journaled on the spindle and engaged with one side of the ball, a bushing rotatably and slidably mounted on the spindle and engaged with the other side of said ball, means slidably connecting the bushing to the hub for rotation therewith, a removable cap threadedly mounted on one end of the hub, a coil spring mounted in the cap and engaged with the bushing and encircling the end of the spindle for yieldingly urging said bushing against the ball, and a flange on the other end of the hub, said flange constituting means for mounting an earth-working element on said hub.

EDWARD JUSTESEN.